INVENTOR
ELMER M. LIPSEY

BY T. Hayward Brown
ATTORNEY

FIG. 5

3,321,760
MODIFIED LORAN-C PRECISION NAVIGATION SYSTEM WITH COMMUNICATIONS CAPABILITY
Elmer M. Lipsey, Springfield, Va.
(1925 N. Lynn St., Room 1001, Arlington, Va. 22209)
Filed Sept. 23, 1963, Ser. No. 310,956
2 Claims. (Cl. 343—103)

This invention relates generally to Loran-C radio navigation systems of the type used to determine the position of an aircraft or marine vessel, and more particularly, to a method and apparatus for providing such systems with the capability for transmitting and receiving intelligence.

The invention described herein may be manufactured and used by or for the Government of the United States of America for governmental purposes without the payment of any royalties thereon or therefor.

The modern day Loran-C navigation systems, which the present invention improves upon and supplements, include electronic circuitry for accurately measuring the time interval which elapses between the receipt of two separate and distinct radio signals.

In these systems, pulses of radio frequency energy are radiated from a master station. A slave station, which is located at a fixed distance from the master station, receives and re-radiates each such signal emitted by the master station. The output signal transmitted by the slave station is thus delayed in time, in reference to the master signal, by an accurately predetermined and fixed time interval. The time interval which elapses between the first instant of transmission by the master station and the first instant of transmission by a given slave station, includes the time required for the radiant energy to travel to the slave station, as well as a small additional delay interval which is deliberately injected at the slave station. This latter delay interval is referred to in the art as a coding delay.

It is common to utilize two slave stations, which may be spaced at different distances from the Loran-C master transmitter. Each of these slave stations then re-radiates the signal recived from the master station after an accurately predetermined time interval. This combination of a master and two slave stations in the Loran-C navigation system is known as a triad.

Since the radio energy directed to a remote receiver by either a master station or a slave station is propagated at a constant velocity, the difference in the time of receipt of two such signals represents the difference in the length of the transmission paths which connect the master station to the receiver, and the slave station to the receiver.

The locus of all points representing a constant difference in distance from two fixed points is known to describe a hyperbola. The Loran-C navigation system makes it possible for an airborne or shipborne system to exploit this hyperbolic relationship in precisely determining its position. By using a moderately low frequency such as 100 kc., which is characterized by low attenuation, and by measuring differences in time rather than absolute time, the modern day Loran-C system provides unambiguous accuracy within one quarter of a mile, at distances as far as one-thousand miles from the transmitter site.

The theory and operation of the Loran-C radio navigation system are described in detail in an article by W. P. Frantz, W. Dean, and R. L. Frank entitled "A Precision Multipurpose Radio Navigation System," 1957 I.R.E. Convention Record, Part 8, page 79.

The Loran-C systems of the type described in the foregoing article, and employed at the present time, are pulse type systems. The energy which is radiated by the master station and by each slave station in the triad, takes the form of a pulse train which includes a number of precisely timed bursts of radio frequency energy. Although the system operates generally, with groups of eight (8) discrete time-spaced pulses, it is common practice for the master station to emit one additional "blip," thus providing a grouping of nine (9) pulses for purposes of identification. The necessity for long range propagation of a readily detectable signal has resulted in the choice of a 100 kc. carrier frequency in the Loran-C systems, which is to be distinguished from the much higher frequency carrier used in certain predecessor Loran systems. The characteristic eight-pulse and nine-pulse groupings referred to immediately above, take the form of discrete pulses of this 100 kc. carrier frequency. By using pulses of the 100 kc. carrier in this manner, extremely long distance transmission at reasonable power expenditure is ensured.

The discrete pulses of 100 kc. carrier frequency radiated by a Loran-C transmitter are characterized by an extremely precise spacing of 1000 microseconds between adjacent pulses. In other words, the leading edge of the envelope of each 100 kc. burst in a characteristic eight-pulse or nine-pulse grouping will precede the leading edge of the enevelope of the succeeding 100 kc. pulse by exactly 1000 microseconds. Any given point on the envelope of a given 100 kc. pulse will, in like manner, be separated by exactly 1000 microseconds from the corresponding point on the envelope which defines an adjacent pulse.

It will thus be appreciated that the signals radiated by the master station and the slave stations in a Loran-C triad take the form of a series of pulses separated by the precise 1000 microsecond interval referred to immediately above.

The instant at which the transmisison of this pulse train is initiated by each slave station, as earlier explained, is precisely correlated in time with the instant at which transmission is initiated by the master station, and is caused to occur at a predetermined interval thereafter. The time delay which occurs between the receipt of the pulse train from the master station, and the corresponding signal from each slave station in the Loran-C system yields hyperbolic lines of position, from which the location of the receiving craft may be accurately determined.

The precisely timed 1000 microsecond interval which occurs between the successive pulses of 100 kc. energy in the Loran-C navigation system is of primary importance in practicing the present invention. Because of this precise spacing between the successive pulses emitted by the transmitter, the signals received by a receiver tuned to the transmitter frequency will include an extremely accurate 1 kc. component. In other words, the detected envelope of the 100 kc. carrier will comprise a series of recurring signals characterized by a repetition rate of exactly 1000 pulses per second. If the *alternate* pulses in this series are eliminated, the resulting signal takes the form of a series of pulses separated by a precise interval of 2000 microseconds. A receiver, which is tuned to 100 kc. to intercept and amplify such a signal, will develop a precise audio component of 500 c.p.s., since the repetition rate of the latter mentioned pulse train is exactly 500 pulses per second.

By varying the characteristics of the output signal of a Loran-C transmitter in accordance with the present invention, it is possible to transmit signals which will produce either the normal repetition rate of 1000 pulses per second, or the reduced repetition rate of 500 pulses per second within a remote receiver. By utilizing the 500 c.p.s. component within the receiver as the "one" character in a standard binary code, and employing the 1000 c.p.s. component as the "zero" character in binary code, these transmissions serve to propagate and develop verbal communications in remotely situated receivers.

The long distances over which the 100 kc. signal is capable of propagating in pulse form, and the present day geographical distribution of Loran-C transmitters combine to produce an extremely large area over which Loran-C transmission may be received. This area is known to include practically the entire northern hemisphere. This means that a properly tuned receiver circuit located anywhere within this radiation pattern can be used to intercept binary coded Loran-C transmissions. By means of proper decoding circuitry, which is provided in accordance with the present invention, it will now be appreciated that signals and communications can be propagated and received throughout the entire geographical area which presently lies within range of Loran-C transmissions.

According to one embodiment of the present invention, Loran-C navigation transmitters are used to radiate coded signals capable of energizing a visual or audible alarm system associated with any one of a number of civil defense warning receivers located within the radiation pattern of such transmitters.

According to another embodiment of the present invention, there is provided a civil defense warning receiver adapted to receive coded alarm signals transmitted by a remote Loran-C transmitter.

In accordance with another aspect of the invention, there is provided an information channel receiver which is adapted to receive and convert binary coded data from a remote Loran-C transmitter into a verbal communication or message.

In accordance with a different aspect of the present invention, means are provided for selectively changing the repetition interval of the 100 kc. pulses emitted by a Loran-C transmitter, from 1000 microseconds to 2000 microseconds, according to a predetermined binary coded sequence.

According to still another aspect of this invention, civil defense warning receivers and information channel receivers are provided which are suitable for use in combination with the circuitry of a conventional Loran-C receiver, and which operate in conjunction therewith without disturbance to or diminution in the operational efficiency of such equipment.

In accordance with the foregoing, a primary object of the present invention is to disclose a new method of transferring intelligence and messages by means of Loran-C navigation systems.

Another object of the invention is to teach ingenious combinations of circuitry and components designed to initiate an audible or visual alarm responsive to receipt of coded signals from a Loran-C transmitter.

A further object of the invention is to disclose unique combinations of circuitry and components adapted to receive and develop a verbal communication in response to binary coded signals emitted by a remote Loran C transmitter.

A still further object of this invention is to teach technique and circuitry for modifying a conventional Loran-C transmitter circuit to provide a capability for periodically reducing the pulse repetition rate of the output signals according to a predetermined sequence.

These and other objects of the invention will become apparent by referring to the following drawings, in which like numerals indicate like parts, and in which.

Figure 1:
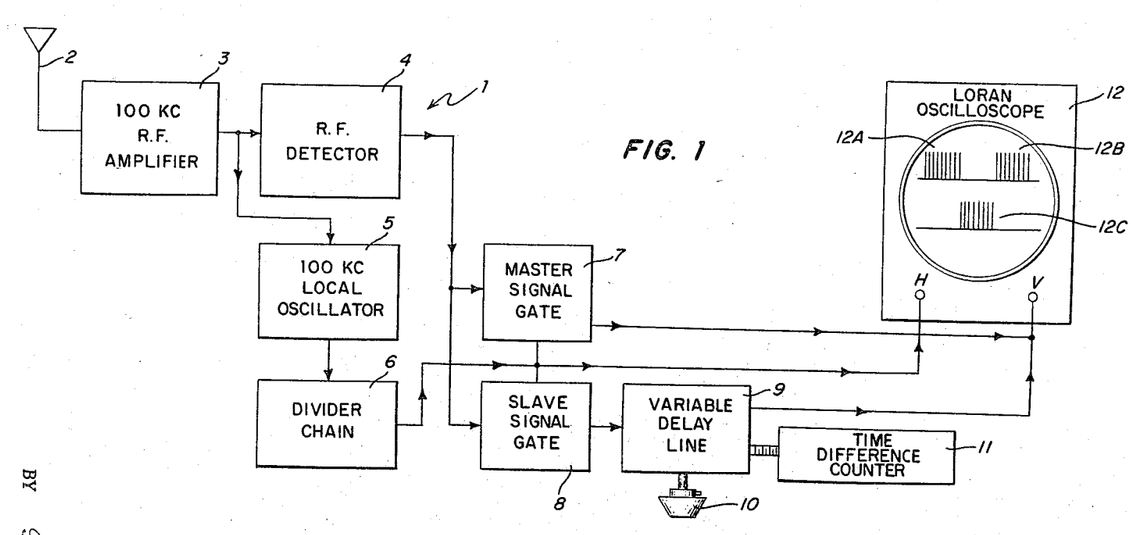
FIGURE 1 is a block diagram which shows certain selected stages of circuitry in the receiver of a conventional Loran-C system.

Turning now to the detailed description of the invention, and more particularly to the accompany drawings, reference is made to FIGURE 1. In this figure, the reference numeral 1 has been used to indicate generally certain selected stages of circuitry in the receiver of a conventional Loran-C system. It will be appreciated that the block diagram in FIGURE 1 does not purport to show the complete circuit of a modern day Loran-C receiver, and that the number of stages shown in the diagram has been limited to the number necessary to form a basis for understanding the present invention.

In the Loran-C receiver system shown in FIGURE 1, the reference numeral 2 has been used to identify a conventional antenna 2. The antenna 2 is disposed to intercept radio frequency energy radiated by a remote Loran-C transmitter, and develop a faint radio frequency signal in response thereto.

The signal developed by the antenna 2 is applied to the input terminals of a 100 kc. R.F. amplifier 3. The amplifier 3 may comprise a conventional fixed tuned circuit, such as the well known T.R.F. circuit, and is tuned to 100 kc. in order to respond to the pulses of energy radiated from a Loran-C transmitter. This amplifier, of course, has the function of greatly increasing the amplitude of the faint radio frequency voltages induced in the antenna 2.

The output of the amplifier 3 is applied to an R.F. detector 4 in order to develop a voltage proportional to the envelope of the incoming 100 kc. carrier, and to dispose of the carrier. The detector 4 may take the form of a standard half-wave detector.

The amplified Loran-C signals which emerge from the amplifier 3 in FIGURE 1 take the form of a pulse train comprised of a number of discrete pulses of 100 kc. energy. The signals received from the master station will normally include nine such pulses, while those received from a slave station comprise eight pulses. Within the detector 4 the 100 kc. carrier within these pulses is eliminated, and an output waveform proportional to the envelope of the carrier is produced.

The amplified pulses of 100 kc. energy produced by the amplifier 3 in FIGURE 1, are also applied to a 100 kc. local oscillator 5, which is locked both in frequency and in phase with the incoming 100 kc. signal.

The sinusoidal 100 kc. output signal developed by the local oscillator 5 is coupled to a divider chain 6. This divider chain contains conventional pulse squaring and frequency division circuitry. This circuitry first produces a series of time-spaced square waves, which occur in time coincidence with the positive nodes or loops of the sine wave signal received from the local oscillator. These square waves are then applied to the frequency division circuits, in order to produce an output pulse train at a predetermined reduced frequency. The latter frequency is, of course, a sub-multiple or decimal fraction of the 100 kc. frequency produced by the local oscillator.

The output voltage pulses from the divider chain 6 are used to control the sweep of a conventional Loran-C oscilloscope, and to energize certain gating circuits, in a manner which is explained more fully in the succeeding portions of this specification. For purposes of the present explanation, it is simply necessary to appreciate that the divider chain 6 effects successive divisions in frequency until the output signal reaches a frequency equal to the pulse group repetition interval associated with incoming Loran-C signals.

The output signals developed by the divider chain 6, as shown in FIGURE 1, are connected to control the operation of a master signal gate 7, and a slave signal gate 8. The time intervals during which signals from a master station or a slave station can reach the sweep control circuits of an oscilloscope, are precisely controlled by the gating circuits 7 and 8, and the gating intervals of these circuits are initiated by the voltage pulses received from the divider chain.

Directly to the right of the divider chain 6 in FIGURE 1, the input terminals of the master signal gate 7 and the slave signal gate 8 are each connected to receive the output signals produced by the R.F. detector 4. This means that the groups of time-spaced discrete voltage pulses corresponding to the envelope of the 100 kc. carrier which are produced by the detector 4, are available to pass through the master signal gate 7, or the slave gate 8 during the appropriate time intervals. As mentioned earlier in the specification, the signals from a slave station normally include eight precisely spaced pulses, while the signal from the master station includes nine such pulses, for purposes of identification.

Because of the fact that the pulses from a Loran-C master station normally arrive at the receiver somewhat earlier in time than the pulses radiated from a slave station, it is necessary for the receiver circuitry which regulates the display of such pulses on a cathode ray tube to include appropriate time delay circuitry, capable of retarding voltage pulse trains by an accurately predetermined amount.

The output signal from the slave signal gate 8, more particularly, is applied to a variable delay line 9. The delay line 9 includes conventional circuitry and components capable of producing an output waveform which duplicates the input waveform, and lags this signal by a predetermined time interval. This time delay interval may be controlled by an operator, and changed from time to time by means of a manually operable dial 10. The degree of phase-shift, or the time interval by which the output waveform lags the input waveform, is indicated on a time difference counter 11.

Turning now to the manner in which the time difference between the signals received from the Loran-C master and slave transmitters is measured, reference is again made to portion of FIGURE 1 which includes the master signal gate 7, the slave signal gate 8, and the delay line 9. The output signals developed by the master signal gate 7, and the delay line 9, are connected to drive the vertical sweep circuit of a Loran oscilloscope 12. Although the oscilloscope 12 aids in the Loran measurement, by permitting an observable alignment between master and slave signals, it is also possible ot employ automatic measuring circuitry for ascertaining the characteristic Loran-C time delay, and the invention is not limited to systems which utilize an osciiloscope read-out.

In FIGURE 1, the reference character V is used to indicate diagrammatically the input terminal of the vertical sweep circuit for the oscilloscope 12. It will be noted that the output terminals of the matser signal gate 7 and the delay line 9 are connected to form a common junction, and that this junction is connected directly to terminal V on the oscilloscope.

The reference character H is used in FIGURE 1 to identify the input terminal for the horizontal sweep circuit of the oscilloscope 12. This horizontal sweep circuit is connected to receive the output signal produced by the divider chain 6. This signal, which takes the form of a series of voltage pulses occurring at the characteristic pulse repetition interval of the Loran-C system, is used as a synchronizing signal, to trigger the sweep of the cathode ray tube within the oscilloscope 12.

The oscilloscope 12 shown in FIGURE 1 displays the conventional cathode ray pattern produced by a Loran-C triad consisting of a master station and two slave stations. In this pattern, the group of nine (9) pulses received from a master station, are identified by the reference 12A. The group of eight (8) signals received from the first slave station in the triad is identified by the reference numeral 12B, while the group of eight (8) signals received from the second slave station are designated by the reference numeral 12C.

It will be understood in connection with the system shown in FIGURE 1, that it is possible to align the slave signal directly below the master signal in the oscilloscope pattern, by adjusting the variable delay of the signals which pass through the slave signal gate, by means of the dial 10. In accordance with conventional Loran technique, a second presentation on the oscilloscope is thus made in which only the master signal appears on the top trace, and the slave signal appears on the bottom trace. The master signal trace is initiated by the beginning of the signal from the master gate, and the slave signal trace is initiated by the delayed signal from the slave gate which passes through the variable delay line 9. Thus, by adjusting the dial 10, a slave signal, such as 12C, may be made to shift in time along the bottom trace of the oscilloscope, until it is directly beneath the master signal. When this occurs, the precise time difference between receipt of master signal and the slave signal is registered on the time difference counter 11.

The present invention, as earlier mentioned, is not limited in its applications to Loran-C systems which utlize an oscilloscope type read-out, and the invention is equally applicable to systems which measure the time-difference between the incoming master and slave signals by means of automatic circuitry, computer circuits, or the like.

In the conventional Loran-C systems of type described immediately above, the repetitive radiation of precisely timed 100 kc. pulses serves purely as an aid to navigation, and is used by an aircraft or marine vessel for determining its position. These present day Loran-C systems possess no capability for conveying or exchanging intelligence in the form of signals or communications.

By means of the present invention, conventional Loran-C radio navigation systems may be modified to provide a communications capability. With these modifications the Loran-C equipment may be used to provide a nation-wide system for propagating signals and/or messages. These signals, or messages may be propagated in order to signal the imminence of a civil defense emergency, an enemy attack, or any other noteworthy event.

Figure 2:
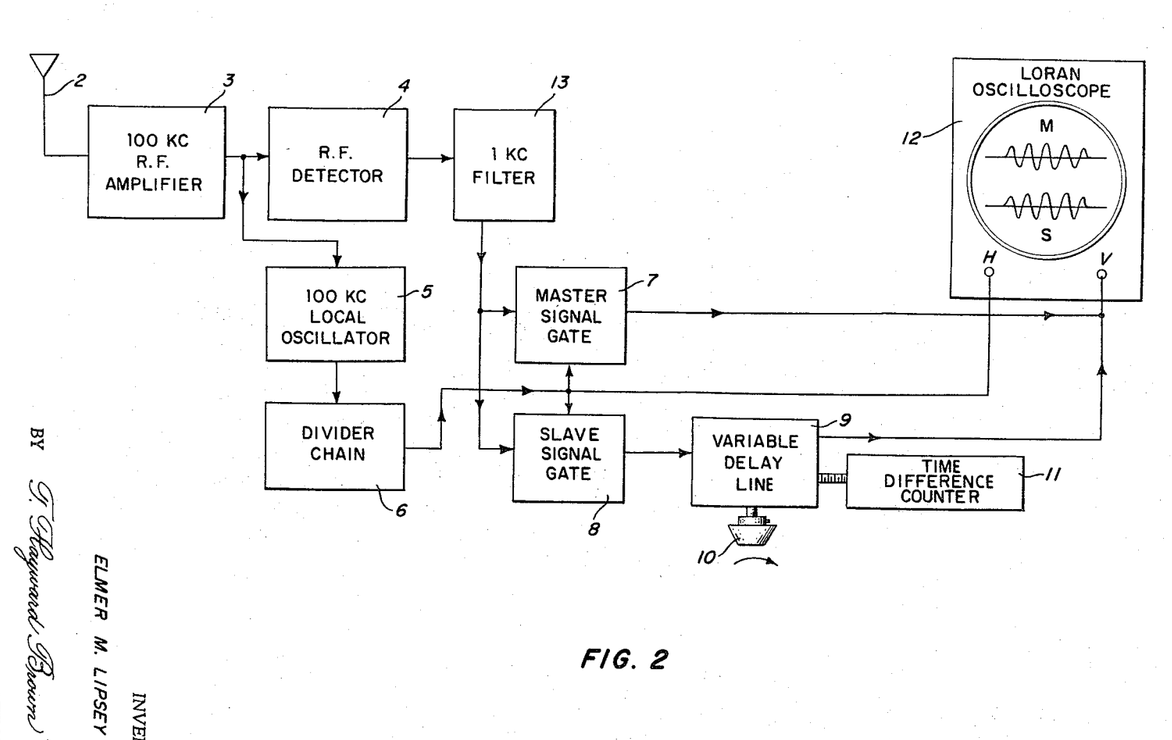
FIGURE 2 is a block diagram which shows certain selected stages of circuitry in a low-range Loran-C receiver designed to eliminate cycle ambiguity.

Reference is now made in this connection to FIGURE 2 of the accompanying drawings, which illustrates certain selected stages of a low-range Loran-C receiver circuit designed to eliminate cycle ambiguity within certain limits of accuracy. The system shown in FIGURE 2 employs the same stages of circuitry in a conventional Loran-C receiver, as the system shown in FIGURE 1. For this reason, the circuitry elements shown in FIGURE 2 have been assigned the same reference numeral, which was used to identify the corresponding element in FIGURE 1. The circuit in FIGURE 2 differs from the circuit in FIGURE 1, by the inclusion of a 1 kc. band pass filter.

One portion of the radio frequency energy radiated by a Loran-C transmitter, as is well known to those skilled in the art, is propagated directly along the surface of the earth. Another component of this energy impinges upon the ionosphere, and may be reflected one or more times between the earth's surface and the ionosphere, by the time it arrives at a given Loran-C receiver. Where radiant energy emitted by a coastal Loran-C station is propagated directly over-water, a portion of this energy will travel upwardly and be deflected back and forth between the ionosphere and the surface of the water one or more times before reaching a ship-borne receiver which has already detected the incoming ground-wave from the transmitter.

Because of this phenomenon, conventional Loran-C receivers intended for use beyond a certain distance from the transmitter, require circuitry which distinguishes between the early signal which travels directly over-water to the receiver, and the later arriving wave which is received only after these reflections between the surface and the ionosphere. Although short range receivers are able to dispense with the circuitry for eliminating sky-wave ambiguity, it has been necessary to deal with the problem of cycle ambiguity by means of several stages of circuitry.

With the system shown in FIGURE 2, which is intended for use at ranges up to 250 or 300 miles, it is unnecessary to provide any circuitry for eliminating the effects of the incoming sky-wave or for eliminating cycle ambiguity. This is accomplished by employing a 1 kc. filter which is caused to ring, or resonate, by discrete voltage pulses received from the output of the R.F. detector 4. Since the filter is tuned to resonate at 1000 c.p.s., and the pulses are supplied by the detector 4 at 1 millisecond intervals, the output signal from the filter takes the form of bursts of oscillatory energy, each of which continues for a predetermined time interval.

In operation, the time-spaced pulses of energy impinging upon the antenna 2 shown in FIGURE 2 are coupled into a 100 kc. amplifier 3. This energy is received in the form of precisely spaced individual pulses. The interval between adjacent pulses is exactly 1000 microseconds. The enlarged version of this wave train produced by the amplifier 3 is applied to an R.F. detector 4, which develops the envelope surrounding the pulses of the 100 kc. carrier frequency, and effectviely eliminates the carrier frequency.

The R.F. amplifier 3 is also connected to feed a 100 kc. oscillator 5, which is locked both in frequency and in phase with the incoming 100 kc. signal, in the same manner described in connection with the circuit shown in FIGURE 1.

The sine-wave output signal of the oscillator 5 is connected to divider chain 6, which produces a square wave signal with a frequency corresponding to the characteristic pulse repetition interval of the Loran-C system. The output pulses from the divider chain 6 are then applied to a master signal gate 7 and a slave signal gate 8. These pulses are also applied to the terminal H on an oscilloscope 12. This terminal is connected to the horizontal sweep control circuit within the oscilloscope. The signal applied to such circuit triggers the sweep for the cathode ray tube, and serves as a synchronizing signal. The oscilloscope in FIGURE 2 shows a first waveform M which illustrates diagrammatically the incoming signal from a master station, and a second waveform S which illustrates diagrammatically the incoming signal from a slave station.

At this point, it is necessary to explain the difference between the signals which traverse the gates shown in FIGURE 2, and those which pass through the gates shown in FIGURE 1. In FIGURE 2, more particularly, the output of the R.F. detector 4 is connected to feed a 1 kc. filter 13. The filter 13 may take the form of a sharply tuned, narrow band-pass filter which employs one or more resonant circuits. These circuits are, of course, tuned to ring, or resonate, at a frequency of 1000 cycles per second.

As earlier mentioned, the time-spaced pulses which emerge from the detector 4 in FIGURE 2 follow one another by precisely 1000 microseconds. The application of these timed-spaced pulses to the filter 13 causes the tuned circuits within such filter to resonate at exactly 1000 cycles per second. This produces an oscillatory output voltage having a duration of, say, 15,000 microseconds. The oscillations within the filter which occur at the natural resonant frequency of the tuned circuits, are reinforced at precisely the proper instant by the pulse train produced by the detector 4.

As will be noted from the block diagram shown in FIGURE 2, the output signal from the 1 kc. filter 13 is applied to the input of the master signal gate 7, and slave signal gate 8. The intervals during which these gates are switched "open" to allow such signals to travel through to the oscilloscope 12, as earlier explained, are initiated by the output pulse signals produced by the divider chain 6.

The interconnection between the gating circuitry and the oscilloscope 12 in FIGURE 2 is the same as that shown in FIGURE 1. The output of the master signal gate 7 is connected to the output of the variable delay line 9 to form a common junction, which is in turn connected to terminal V of oscilloscope 12 to drive the vertical sweep circuit of this device. The input terminal H for the horizontal sweep circuit of oscilloscope 12 is connected to receive a synchronizing signal, and sweep triggering voltage from the divider chain 6, in the manner previously described in connection with FIGURE 1.

In FIGURE 2, the variable delay line 9 is also under the control of a manually operable dial 10 which functions in the same manner as described in connection with FIGURE 1, and the time delay interval introduced by means of this element is registered on a time difference counter 11, which functions in the same manner as its counterpart shown in FIGURE 1.

Continuing with the detailed description of the invention, reference will now be made to FIGURE 3 of the drawings, and to the block diagram of the civil defense warning receiver shown therein. The receiver in FIGURE 3 is intended to receive and operate in response to receipt of a predetermined number of 500 c.p.s. pulses within a predetermined time interval.

The normal Loran-C transmission, as earlier discussed in this specification, takes the form of a series of pulses which follow each other by exactly 1000 microseconds. When alternate pulses are eliminated from such a transmission, the resultant signal takes the form of a train of pulses having a frequency of 500 c.p.s., with a 2000 microsecond interval between adjacent pulses.

Figure 3:
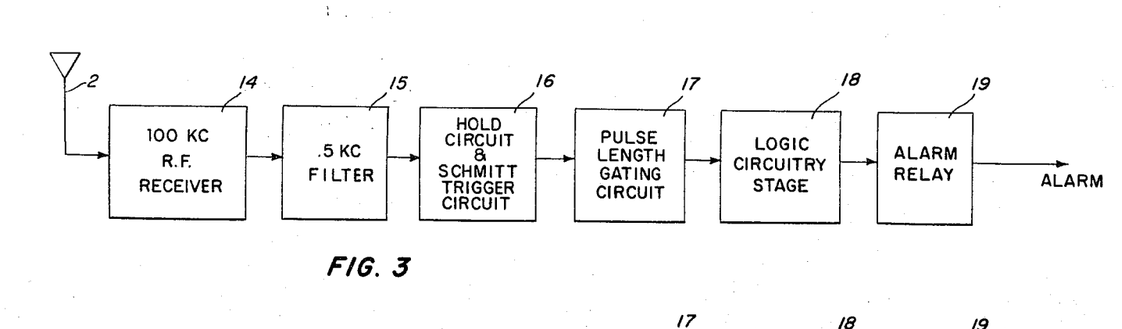
FIGURE 3 shows a block diagram of a civil defense warning signal receiver which is fully compatible with present day Loran-C systems, and works in response to coded signals transmitted thereby.

The receiver circuitry shown in FIGURE 3 sets off a visual or audible alarm in response to the transmission of a coded series of these 500 c.p.s. pulses by a Loran-C transmitter. Such a receiver may be geographically located any where within the radiation pattern produced by one or more Loran-C transmitters, and may be readily energized to provide an alarm signal by any one of such transmitters.

It should be appreciated that the circuit shown in FIGURE 3 can be used independently in the form in which it appears, or in combination with the circuitry of a conventional Loran-C receiver, in a manner which will be explained more fully below.

The receiver system shown in FIGURE 3 is provided with a conventional antenna 2. Radio frequency signals radiated from a remotely situated Loran-C transmitter induce faint potentials in this antenna. The potentials thus developed are applied to the input of a 100 kc. R.F. receiver 14. The receiver 14 may comprise a conventional fixed-tuned type of receiver such as T.R.F. type receiver. Such a receiver has been found to produce good results with an effective bandwidth of 5 kc., which is adequate to provide an optimum signal to noise ratio for the reception of Loran-C signals. The receiver 14, of course, has the function of increasing the amplitude of the incoming pulses of radio frequency energy, and developing the envelope which encloses each such pulse of energy.

The voltage envelopes developed by the detector form a series of time-spaced pulses which occur at a repetition rate of 500 pulses per second. These pulses are applied to a .5 kc. filter 15. The filter 15 may take the form of a narrow band-pass filter, which contains one or more tuned circuits designed to resonate at 500 cycles per second.

The output waveform of the .5 kc. filter is simply an extended pulse of 500 c.p.s. oscillatory energy of perhaps 15,000 microsecond duration. This waveform is fed to a hold filter and Schmitt trigger circuit 16. The hold filter within circuit 16 is a half-wave rectifier which produces a voltage waveform that corresponds essentially to the envelope of the 500 cycle oscillatory input signal. The Schmitt trigger in this circuit functions as an amplitude discriminator and produces an elongated flat-topped pulse. The leading edge of this flat-topped pulse coincides with some predetermined amplitude on the envelope waveform produced by the hold filter, and extends time-wise until the instant this voltage envelope returns to or falls below such predetermined amplitude. The generation of the flat-topped pulse, in other words, continues so long as the envelope waveform equals or exceeds some preset value.

By means of the circuit 16, therefore, the envelope of the 500 kc. energy is developed by the hold filter, and is quantized by the Schmitt trigger to produce a rectangular pulse suitable for application to the succeeding stages of circuitry in the receiver. The length of the pulse is determined by the rise time of the pulse, and the ringing characteristics of the .5 kc. filter 15.

It is important to ensure that the audible or visual alarm feature of the civil defense receiver shown in FIGURE 3 cannot be energized by atmospheric noise, or by other random radio frequency signals which do not actually signify an alarm condition. For this reason, the circuit is provided with a pulse length gating circuit 17.

The pulse length gating circuit 17 receives from the previous stage, the series of elongated flat-topped pulses corresponding to the envelope of the 500 kc. oscillatory signals developed by the hold filter.

The leading and trailing edges of each elongated pulse produced by the circuit 16 are differentiated to produce a series of sharp voltage pulses. The differentiation is accomplished in the early stages of the pulse length gating circuit 17.

The voltage pulse which coincides with the leading edge of the square wave developed by the Schmitt trigger is used within the circuit 17 to initiate a long gate and a short gate. The gating interval of the short gate overlaps the gating interval of the long gate, which extends for an accurately predetermined time after the short gating interval has terminated. The long gate and the short gate acting together in this fashion form a pulse length gate.

The termination of each flat-topped pulse from the Schmitt trigger, as earlier mentioned, coincides with the production of a sharp voltage pulse which coincides with the trailing edge of such flat-topped pulse. This, of course, is because of the differentiating technique referred to immediately above.

The sharp voltage pulse which coincides with the termination of flat-topped pulse must occur between the end of the short gate interval, and the end of the long gate interval, in order to successfully pass through the pulse length gating circuit 17, and energize any of the subsequent stages of circuitry. The pulses falling outside these extremes are completely unable to pass through the gating circuit 17, which renders the circuit immune to atmospheric noise occurring at radio frequencies and other spurious signals.

When the radio frequency energy received by the system shown in FIGURE 3 does, in fact, represent a coded signal emitted by a distant Loran-C transmitter rather than noise, the signals which pass through the gating circuit 17 are applied to a logic circuitry stage 18.

To guard against the possibility of erroneously initiating an audible or visible alarm in response to stay 500 c.p.s. signals incident upon the antenna 2 of the receiver shown in FIGURE 3, the system requires that actuating pulses be arranged according to a definite pattern or coding scheme. Receipt of a predetermined number of impulses within a preset interval is required as a prerequisite to initiating an alarm signal.

This is accomplished by the logic circuitry stage 18 shown in FIGURE 3. The stage 18 includes a conventional one-out-of-four logic circuit. This circuit has the function of requiring that three 500 c.p.s. impulses be received in twelve (12) consecutive pulse repetition intervals, in order to energize alarm signal.

If such a signal is not received, the one-out-of-four logic circuit simply resets itself. When the proper sequence of coded impulses is received, on the other hand, voltage pulses corresponding to the three 500 c.p.s. impulses above mentioned, are applied to the input of the alarm relay 19.

The relay may comprise a conventional normally open switching mechanism which is actuated in response to the accumulation of a predetermined charge on a capacitor. The discrete voltage pulses from the logic circuitry stage 18 are applied to such capacitor. When a sufficient charge has been built up, the closure of alarm relay 19 is effected, and an audible or visual alarm is energized. The capacitor within relay 19 may be calibrated such that two of the impulses received from circuit 17 provide sufficient charge to energize the relay.

The civil defense warning receiver shown in FIGURE 3 has the function of producing such alarms. The present invention also provides means for conveying detailed verbal communications, or instructions, or the like by means of Loran-C radio navigation systems.

Figure 4:
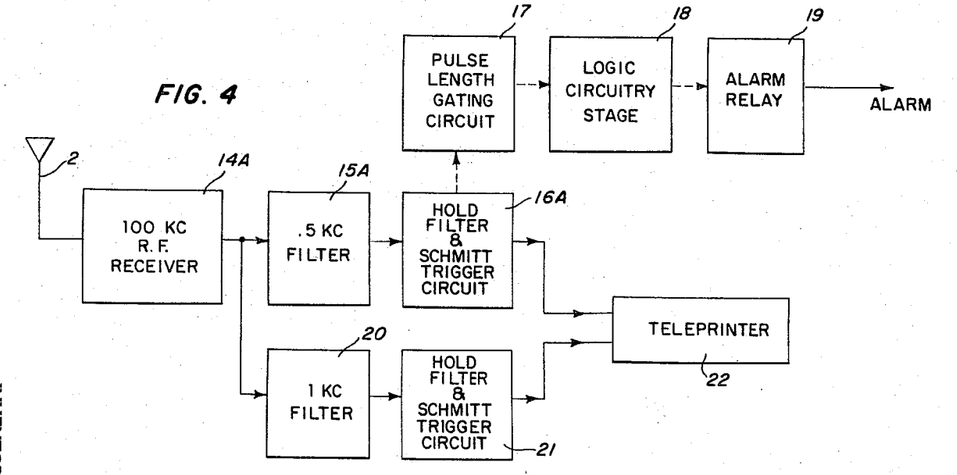
FIGURE 4 shows a block diagram of an information channel receiver which can be used to receive and develop verbal communications propagated by remote Loran-C transmitters. This figure also indicates by means of dashed lines the manner in which the circuit of the FIGURE 3 can be combined to provide audible or visible alarm signals.

FIGURE 4 of the present specification illustrates an information channel receiver constructed according to the teachings of the present invention in order to receive such communications from a remotely situated Loran-C transmitter.

The circuit in FIGURE 4 exploits the accurate spacing which characterizes adjacent pulses of Loran-C transmitters. Because of the precise spacing of 1000 microseconds between the consecutive pulses which characterize such transmissions, the signals received by a receiver tuned to the Loran-C frequency of 100 kc. will take the form of a series of pulses recurring at 1000 pulses per second. These pulses produce a precise audio component of 1 kc. If the alternate pulses are dropped, in such a pulse train, the resulting signal is characterized by a pulse repetition rate of 500 pulses per second. A 100 kc. receiver detecting this signal develops a precise audio component of 500 c.p.s.

By varying the output signal of a Loran-C transmitter in a pre-arranged fashion, it is possible to radiate a coded transmission with intelligence or message data contained implicitly therein. Signals which can produce either the 500 c.p.s. component, or the 1000 c.p.s. component within a remote receiver are radiated by the Loran-C transmitter according to a predetermined pattern.

By employing the 500 c.p.s. component as the "one" character in the standard binary code, and utilizing the 1000 c.p.s. component as the "zero" character in this code, the Loran-C transmissions may be coded according to the standard teleprinter codes, to propagate verbal messages or communications to receivers constructed according to the invention.

In the circuit of FIGURE 4, which serves to receive and decode the communications above referred to, the numeral 2 has again been used to designate an antenna. This antenna is disposed to intercept incoming pulses of 100 kc. radio frequency energy originating from a remote Loran-C transmitter. The antenna applies these pulses of radio frequency energy to a 100 kc. receiver 14A, which produces a series of discrete voltage pulses corresponding to the detected envelope of the incoming 100 kc. pulses.

The pulse trains emanating from the receiver 14A are characterized, by precise spacings of either 1000 microseconds, or 2000 microseconds. In other words, certain groups of these voltage pulses are characterized by a repetition rate of 1000 pulses per second, while other groups are characterized by a repetition rate of 500 pulses per second.

The output signal from the receiver 14A in FIGURE 4, is coupled to a .5 kc filter 15A. The filter 15A comprises a sharply tuned band-pass filter which is adjusted to ring, or resonate 500 c.p.s., and produce an oscillatory output signal, which may extend for as long as 15,000 microseconds.

The 500 c.p.s. oscillatory signal emitted by the filter 15A is connected to feed a hold filter and Schmitt trigger circuit 16A. The circuit 16A produces a flat-topped elongated square wave in exactly the same manner as described in connection with FIGURE 3.

It will be appreciated that the receiver 14A, the filter 15A, and the circuit 16A shown in FIGURE 4, are identical to the correspondingly designated circuits shown in FIGURE 3, and operate to produce the same results which were referred to in the detailed description of such circuit.

From this it follows, of course, that the information channel receiver in FIGURE 4 uses three of the same type of circuits which are utilized in the civil defense warning receiver shown in FIGURE 3. Where it would be desirable to add the capability for sounding an audible or visual alarm to the circuit of the communication system shown in FIGURE 4, it is simply necessary to connect the pulse length gating circuit 17, the logic circuitry stage 18, and the alarm relay stage 19, in the manner shown by the dashed lines in FIGURE 4.

In order to convert the incoming 100 kc. pulses to a binary or digital code, the circuit shown in FIGURE 4 utilizes a pair of filters. One of these is the .5 kc. filter referred to immediately above. The other filter is a 1 kc. filter, which is identified by the reference numeral 20. The output of R.F. receiver 14A is connected to feed this 1 kc. filter 20, as well as the filter previously described. The filter input for the filter 20, like that of the filter 15A, takes the form of a series of pulses which correspond to the envelope of the 100 kc. bursts arriving at the antenna.

The impulses of 1000 c.p.s. oscillatory energy produced by the filter 20 are applied to a hold filter and Schmitt trigger circuit 21. The filter 21 is the same type of narrow band pass, sharply tuned circuit as the 1 kc. filter 13 described in detail in conjunction with FIGURE 2. The hold filter and Schmitt trigger circuit 16A operates in the same manner as the correspondingly designated counterpart 16 in FIGURE 3, and is the same type of circuit.

The series of output pulses generated by the .5 kc. filter 15A, and the 1 kc. filter 20 in FIGURE 4 are quantized, to form elongated flat-topped waves, by the Schmitt trigger circuits 16A, and 21, respectively. Certain of these flat-topped waves correspond to the pulses received from the transmitter at a repetition rate of 1000 pulses per second, while others correspond to incoming pulses arriving at the rate of 500 pulses per second. These flat-topped signals are supplied to a conventional teleprinter 22. The teleprinter, which is of conventional design and construction, includes standard circuits of known construction for converting binary coded input signals into an imprinted verbal message. The initial variation of the Loran-C signals, between the two different pulse repetition rates has, of course, been effected according to the binary code system at the transmitter.

With the embodiment shown in FIGURE 4, it is possible to receive a verbal communication from a remotely situated Loran-C transmitter. With this circuit, it is also possible to energize a visual or audible alarm in response to the receipt of a properly coded signal, by connecting the stages 17, 18, and 19 as shown by the dashed lines.

Because of the fact that the radio frequency energy radiated by present day Loran-C systems is known to blanket practically the entire northern hemisphere, the circuit in FIGURE 4 may be used as a civil defense warning receiver in an extremely large geographical area. By positioning a number of these receiver circuits throughout the United States, there is provided a practical and efficient technique for communicating with the appropriate officials in the event of an emergency condition. The manner, in which the coded signals indicative of such a condition are superimposed upon the normal Loran-C transmissions, is explained in detail later in the present specification.

Although the system shown in FIGURE 4 provides an eminently practicable circuit for receiving warning signals indicative of civil defense emergencies and the like, it will be appreciated that the circuit is capable of receiving other types of normal day-to-day communications, and that the invention is not limited to the reception of emergency type signals or messages.

At this point in the present specification, it is advisable to again emphasize that the civil defense warning receiver circuitry shown in FIGURE 3 may be used independently, in exactly the form depicted. The information channel receiver shown in FIGURE 4 may, in like manner, also be used independently exactly as it is depicted, either with or without the additional stages of circuitry depicted by the dashed lines. This means that the successful use of the circuits shown in FIGURE 3 and FIGURE 4 at a given location does not require the presence of a Loran-C receiver circuit at such location.

On the other hand, the circuits shown in FIGURE 3 and FIGURE 4 are wholly compatible with conventional Loran-C receiver circuits, and can readily be connected to supplement and improve upon the capability of such circuits. These embodiments of the invention may be connected directly into the circuit of modern day Loran-C receivers, and operated in combination with such a receiver, without any attendant loss of efficiency, or disturbance to the normal functioning of the Loran-C navigation system.

In order to accomplish this modification, the 100 kc. R.F. receiver shown in FIGURE 4 may be dispensed with, and the common juncture between the .5 kc. filter 15A and the 1 kc. filter 20, is simply connected to the output terminal of the R.F. detector of a Loran-C receiver. The line connecting the output of the R.F. detector to the master signal gate 7, and the slave signal gate 8 in the conventional fashion (see FIG. 1) remains connected.

Figure 5:
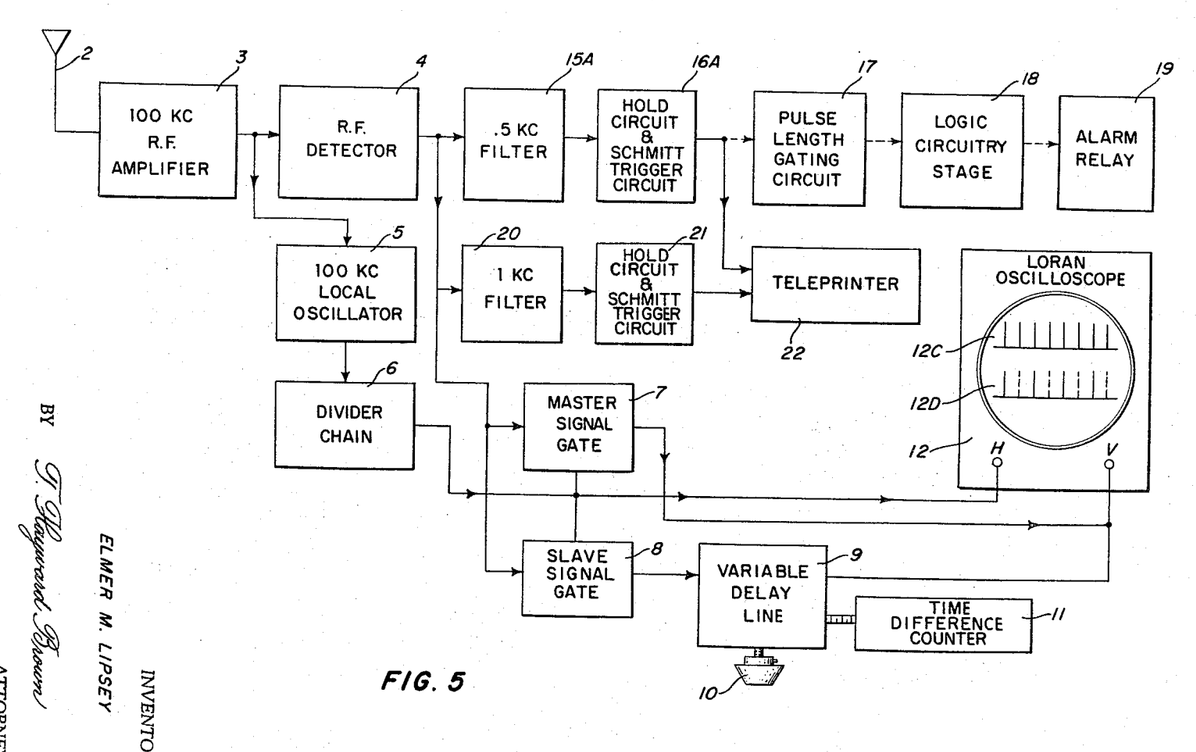
FIGURE 5 is a block diagram which includes certain selected stages of circuitry in a conventional Loran-C receiver, and illustrates the manner in which the circuits shown in FIGURE 3 or FIGURE 4 may be connected into such a receiver.

FIGURE 5 shows the block diagram of a Loran-C received modified in this manner to include the information channel receiver circuitry shown in FIGURE 4.

In FIGURE 5, the stages of circuitry which are the same as the correspondingly designated elements in the conventional Loran-C receiver shown in FIGURE 1, are identified by the same reference numerals. The stages of circuitry in FIGURE 5, which are the same as those bearing the same legend in FIGURE 4, are also identified by the same reference numerals which were used in connection with that figure.

In FIGURE 5, more particularly, incoming radio signals from a remote Loran-C transmitter are detected by means of an antenna 2. These signals take the form of time-spaced pulses of 100 kc. radio frequency energy. The incoming signals may arrive at a rate of either 1000 pulses per second or 500 pulses per second, depending upon the pulse repetition rate of the transmitter output signals at a given instant. These signals are applied to a 100 kc. R.F. amplifier 3. The output potentials of the amplifier 3 are supplied to an R.F. detector 4, which develops the envelope of the 100 kc. carrier, in a manner previously described, and produces a series of voltage pulses corresponding to the envelopes of successive pulses of carrier frequency.

The amplified radio frequency output signals from amplifier 3 are also applied to a 100 kc. local oscillator 5 which is locked both in frequency and phase with the incoming 100 kc. carrier frequency.

The sine wave output signal from oscillator 5 is applied to a divider chain 6 which squares the wave, eliminates the negative loops, and effects successive divisions in frequency, in a manner described earlier in conjunction with the other embodiments of the invention.

The output pulses from the divider 6 are used to initiate the conductive intervals in a master signal gate 7 and a slave signal gate 8. The output waveform developed by the slave signal gate 8 is applied to a variable delay line 9, within which the time delay interval may be manually adjusted or varied by means of dial 10. The time delay interval thus introduced is registered on a time difference counter 11, in the known manner.

Above the time difference counter 11 in FIGURE 12, there is shown a conventional Loran oscilloscope 12. The cathode ray pattern shown on the oscilloscope 12 is illustrative of the alternate pulse-elimination technique, which forms a basis for the practice of the invention.

The cathode ray pattern thus displayed includes a group of pulses 12C on the upper trace. This grouping typifies a normal Loran-C signal. The pulses in this grouping, eight in number, are characterized by an extremely precise 1000 microsecond interval between adjacent pulses. On the lower trace of the cathode ray tube, the reference numeral 12D identifies a pulse grouping in which alternate pulses have been eliminated, in order to provide a 2000 microsecond interval between successive pulses. The technique and circuitry provided by the present invention for actuating the Loran-C transmitter to accomplish this frequency reduction is explained in detail in the later portions of the present specification.

Returning to the circuit shown in FIGURE 5, which is of immediate interest, reference will now be made to the circuitry combined with the conventional Loran-C receiver system, for developing the binary coded message transmitted from a remote Loran-C station. The R.F. detector 4, more particularly, is connected to feed a .5 kc. filter 15A and a 1 kc. filter 20, the master signal gate 7 and the slave signal gate 8.

The .5 kc. filter 15A comprises a sharply tuned band pass filter, which contains one or more circuits adjusted to resonate at 500 c.p.s. The 1 kc. filter 20 comprises a sharply tuned band pass filter containing one or more circuits adjusetd to resonate at 1000 c.p.s. In general, each such filter will respond only to incoming pulses arriving at its own resonant frequency, and will reject incoming signals occurring at the resonant frequency of the other filter.

The oscillatory output signals which emerge from the .5 kc. filter and the 1 kc. filter are detected and changed to elongated flat-topped square waves by means of the hold filter and Schmitt trigger circuits 16A and 21, respectively. These square waves, which correspond to sequentially recevied groupings of 1000 c.p.s. and 500 c.p.s. energy from the remote Loran-C transmitter, are coded according to conventional binary zero-and-one combinations to convey a message.

In order to retrieve this message, and develop the intelligence implicit within such binary coded transmissions into a readable form, the coded signals in FIGURE 5 are applied to a conventional teleprinter 22. The teleprinter 22 employs conventional circuitry and components to convert the coded impulses into potentials which actuate type strikers and imprint the message on paper, tape, or other suitable media.

The circuitry previously described in this specification for initiating an audible or visual alarm, may be connected to operate in conjunction with conventional Loran-C receiver circuitry.

In FIGURE 5, the pulse length gating circuit 17, the logic circuitry stage 18, and the alarm relay 19, may be connected to sample the output signals produced by the hold filter and Schmitt trigger circuit 16A. These circuits, acting in conjunction with the R.F. amplifier 3 and R.F. detector 4 of the Loran-C receiver, will function in exactly the same manner as describtd in connection with FIGURE 3.

With this arrangement, the circuit shown in FIGURE 5 will respond to and develop verbal communications, and will initiate an audible or visible alarm signal. It should be appreciated, in this connection, that the civil defense warning receiver shown in FIGURE 3 can be connected into a conventional Loran-C receiver which has not been equipped with the portion of the circuit shown in FIGURE 4, required to receive and develop coded verbal communications.

The circuits of the present invention which provide visual or audible alarm signals, and the circuits which develop the coded verbal communications transmitted at conventional Loran-C frequencies, all require input pulse signals in which the normal repetition rate of 1000 pulses per second, is selectively reduced from time to time to 500 pulses per second.

According to the present invention, means are provided for selectively eliminating the alternate pulses produced and propagated by a Loran-C transmitter.

Figure 6:
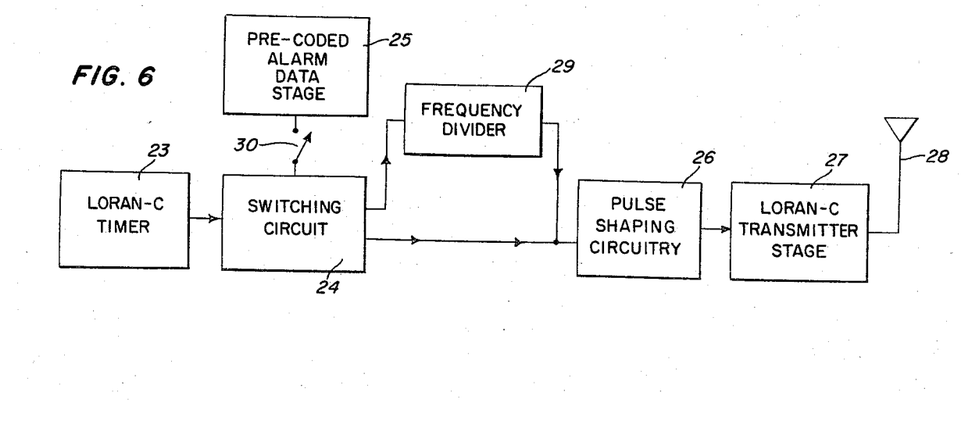
FIGURE 6 is a block diagram which shows certain selected stages of circuitry in a Loran-C transmitter circuit, and illustrates how such a transmitter has been modified in accordance with the present invention, to transmit binary coded communications or alarm signals.

Reference is made in this connection to FIGURE 6, which shows a block diagram of certain selected stages in a conventional Loran-C transmitter which has been modified in accordance with the teachings of the invention.

The reference numeral 23 has been used in this figure to identify a conventional Loran-C timer. This timer includes appropriate stages of circuitry, such as the 100 kc. local oscillator and divider chain of the type previously discussed. The timer produces a series of sharp voltage pulses characterized by a precise 1000 microsecond interval spacing between adjacent pulses.

In order to selectively eliminate the alternate pulses in the time-spaced series of pulses produced by the timer, the circuit includes a switching circuit 24.

The switching circuit is under the control of a precoded alarm data stage 25. In normal Loran-C operation, the groups of time-spaced pulses which emerge from the timer 23 pass through the switching circuit 24, without hindrance or diminution in frequency, and are radiated in the normal manner. Under these conditions of normal operation, the pulses emerging from the switching circuit 24 are applied to a pulse shaping circuit 26. After shaping, the pulse group is coupled to the Loran-C transmitter stage 27. This stage 27 may include a conventional Class "A" or Class "AB" power amplifier, along with means for modulating the incoming pulses onto a 100 kc. carrier wave. The output signal from stage 27, at greatly enhanced power, is coupled to antenna 28 and propagated in the usual manner.

In the system shown in FIGURE 6, means are provided for energizing the switching circuit 24, in order to eliminate the alternate voltage pulses from the characteristic Loran-C pulse grouping. The switching circuit 24 is actuated to route the pulse train either directly to the pulse shaping circuit 26, or to the input terminals of a frequency divider 29. When the output pulse train from the timer is diverted through the frequency divider 29 it is halved in frequency, and the normal 1000 microsecond spacing between adjacent pulses is increased to 2000 microseconds. The divider 29 may include a conventional flip-flop circuit and diode gate circuit of known construction.

During certain time intervals, in accordance with the foregoing, the signals from the timer 23, which normally occur at a rate of 1000 pulses per second, are applied by the switching circuit 24 directly to the shaping circuit 26 without diminution in frequency. During other intervals, however, signals from timer 23 are selectively assigned to the frequency divider 29, which generates a series of output pulses having a repetition rate of 500 pulses per second. These pulses, at the reduced repetition rate, are then applied to the pulse shaping circuit 26 and the transmitter stage 27, in the manner previously explained, and are radiated by antenna 28.

It will thus be seen that by selective actuation of the switching circuit 24, it is possible to vary the intervals during which groupings generated by the timer 23 are radiated with undiminished frequency, or with reduced frequency.

The switching circuit 24 changes the path of the output pulse train from the timer 23 between the pulse shaping circuit 26 and the frequency divider 29 according to a prearranged sequence. The circuit 24 will be seen to include two output channels. The prearranged switching sequence effected by the circuit 24 may be programmed into a precoded alarm data stage 25, in anticipation of the occurrence of a possible civil defense emergency. Upon the happening of such an emergency, it is simply necessary to close a switch 30, in order to place the switching circuit 24 under the control of the precoded alarm data stage 25. By this means, the frequency of the output pulses radiated by antenna 28 is immediately caused to alternate between 1000 c.p.s. and 500 c.p.s. in accordance with the characteristics of the predetermined communication previously stored in the alarm data stage 25. This coding may correspond to the standard teleprinter code.

The alarm data stage 25, in accordance with the precoded data, operates to shunt output voltage pulses from timer 23 through frequency divider 29 in order to effect transmission of the coded series of 500 c.p.s. pulses required to actuate the visual or audible alarm provided in FIGURE 3. The alarm data stage 25 in this manner also energizes the switching circuit 24, to rapidly change the repetition rate of the radiated pulses between 500 pulses per second and 1000 pulses per second, in order to transmit a coded verbal communication suitable for reception by the circuit shown in FIGURE 4 of the present invention.

It should be appreciated that the precoded data within the stage 25, may take the form of coding which is effected immediately prior to, or subsequent to, the closure of switch 30, and that the invention is not limited to employing data which has been coded a long time prior to actual usage of the equipment.

It is also to be understood that the circuits contained within the individual blocks contained in the block diagrams FIGURE 1 through FIGURE 6 are conventional, and that the combination and organization of these circuits in practicing the methods of the present invention, are deemed to fall within the purview of the invention.

It will thus be appreciated that the coded data which has been programmed into the alarm data stage 25 may readily control the character of the output signal radiated from the Loran-C transmitter. As earlier mentioned, the use of conventional Loran-C radio navigation systems for transmitting alarm signals and coded communications in accordance with the teachings of the present invention, does not degrade or detract in any way from the normal operation of these systems.

Although certain embodiments of the present invention have been described in detail, in accordance with the requirements of the Patent Statute, it will be evident that certain alterations, substitutions, and modifications may be made therein by one skilled in the art, and that the embodiments resulting from such changes fall equally well within the spirit and scope of the appended claims.

What is claimed is:

1. In a modified Loran-C radio navigation receiver which includes an oscilloscope with a master signal gate and a slave signal gate for controlling the application of a master signal and a slave signal to the sweep circuits of said oscilloscope to determine the time interval between receipt of said master signal and said slave signal, and a detector for developing said master signal and said slave signal as the respective envelopes of incoming bursts of radio frequency energy arriving at either of two distinct pulse repetition rates, the improvement for decoding message data implicit within such incoming radio frequency energy which comprises; a pair of sharply tuned band-pass filter means connected to said detector, one of said filter means being tuned to resonate at a frequency equal to one of said repetition rates and producing output pulse trains of oscillating energy in response thereto, and the other said filter means being tuned to resonate at a frequency equal to the other said repetition rate and producing output pulse trains of oscillating energy in response thereto; first means connected to produce a first signal corresponding to the envelopes of the successive pulses of oscillatory energy contained within one such pulse train; and develop an output signal corresponding to a "one" character in a binary notation reponsive thereto; second means connected to produce a second signal corresponding to the envelope of the successive pulses of oscillatory energy contained within the other of said pulse trains, and develop an output signal corresponding to the "zero" in binary code responsive thereto; and means connected to receive said output signals corresponding to said binary coded characters and develop said massage data implicit therein.

2. In a modified Loran-C radio navigation receiver which includes gating circuits for applying energizing potentials to measuring circuitry to determine the time interval between receipt of a master signal and a slave signal, and a detector for developing the envelope of incoming bursts of radio frequency energy arriving at either of two distinct pulse repetition rates, the improvement for decoding message data implicit within such incoming radio frequency energy which comprises: a pair of filters connected to receive the output signals developed by said detector, one of said filters being tuned to resonate at a frequency equal to one of said repetition rates and the other of said filters being tuned to resonate at a frequency equal to the other of said repetition rates; a hold filter and Schmitt trigger circuit connected to each of said filters to receive said output signals from said filters and produce signals corresponding to the "zero" and "one" characters in binary code therefrom, and means connected in-circuit with each of said hold filter and Schmitt trigger circuits to receive said binary coded signals and retrieve said message data implicit therein.

References Cited by the Examiner

UNITED STATES PATENTS

| | | | |
|---|---|---|---|
| 2,614,210 | 10/1952 | Purington | 325—40 |
| 2,728,909 | 12/1955 | Palmer | 343—103 X |
| 2,969,538 | 1/1961 | Palmer | 343—105 |
| 3,092,833 | 6/1963 | Phillips | 343—105 |
| 3,165,583 | 1/1965 | Kretzoner et al. | 325—30 X |
| 3,183,442 | 5/1965 | Filipowsky | 325—40 |
| 3,206,678 | 9/1965 | Hannon | 325—30 X |
| 3,209,356 | 9/1965 | Smith | 343—105 |
| 3,249,874 | 5/1966 | Webber | 325—364 |
| 3,263,231 | 7/1966 | Smith et al. | 343—103 X |

RODNEY D. BENNETT, *Primary Examiner.*

CHESTER L. JUSTUS, *Examiner.*

H. C. WAMSLEY, *Assistant Examiner.*